Dec. 19, 1939.  J. MIHALYI  2,184,017

PHOTOGRAPHIC CAMERA

Filed Nov. 27, 1937

Joseph Mihalyi
INVENTOR

BY
ATTORNEYS

Patented Dec. 19, 1939

2,184,017

UNITED STATES PATENT OFFICE 2,184,017

PHOTOGRAPHIC CAMERA

Joseph Mihalyi, Rochester, N. Y., assignor to Eastman Kodak Company, Rochester, N. Y., a corporation of New Jersey Application November 27, 1937, Serial No. 176,826

1 Claim. (Cl. 95—64)

This invention relates to photographic cameras and more particularly to cameras provided with a light sensitive device for determining the setting of the exposure control devices.

In cameras of this type it is important to have the light sensitive cell remain at a constant level of sensitivity for otherwise the exposure as determined by the cell controlled device would not be accurate.

It is an object of the invention to provide such cameras with means for shielding the cell from light whenever it is not being used or ready for use so that during the long intervals between periods of use the cell will not be subjected to strong light and possible deterioration.

Another object of the invention is the provision of means for altering the amount of light falling on the cell in accordance with some factor of the exposure without varying the exposed area of the cell thereby eliminating any inaccuracy which might otherwise appear due to variations in sensitivity over the surface of the cell.

Other objects and advantages of the invention will become apparent from the following description when read in connection with the accompanying drawing in which.

Figure 1:
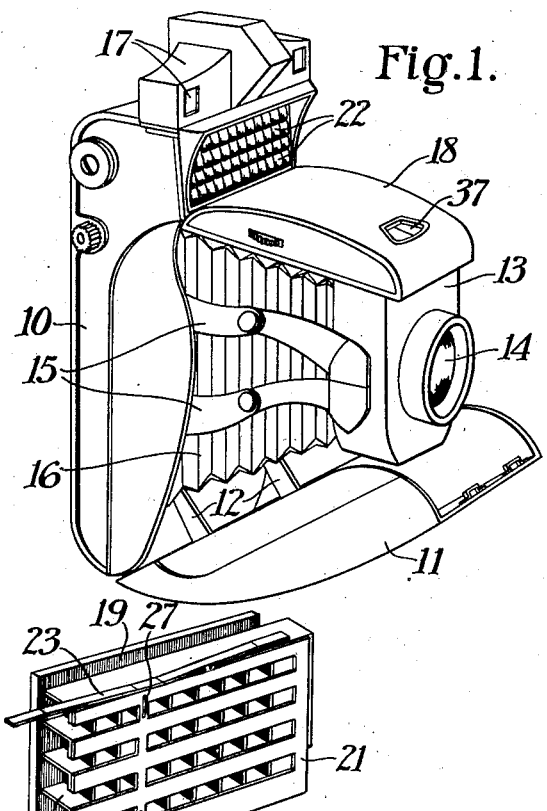
Fig. 1 is a perspective view of a camera incorporating the invention.
Figure 3:
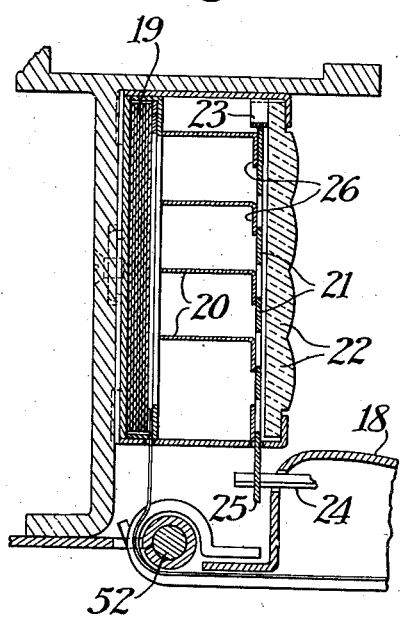
Fig. 3 is a detail section of the cell and its baffle and its coupling with the camera; and, Fig. 4 is a front elevation partially cut away showing the arrangement for limiting the cone angle and for regulating the intensity of the light falling on the cell.

In photographic cameras provided with a device including a light sensitive cell for determining or regulating the setting of the camera for correct exposure it is generally desirable to restrict the cone of light falling on the cell to substantially the angle subtended by the picture image. It is also desirable to govern the amount of light falling on the cell to alter its output as for example in accordance with one of the exposure factors such as the shutter speed setting of the camera.

In accordance with the present invention the cone angle of the light falling on the cell is limited by a multiple chamber baffle behind which the cell is positioned and in front of which are located a plurality of lenses so shaped that their distance from the cell substantially equals their focal lengths. Means are provided for adjusting the effective apertures of these lenses whereby the amount of light reaching the cell is varied without disturbing the distribution of the light on the surface of the cell.

The diaphragming means for these lenses is, according to the invention, adapted to reduce to zero the effective apertures of the lenses whenever the camera is not ready for use thereby affording complete protection for the cell during the long intervals when the camera is idle.

The invention may readily be incorporated in any exposure meter whether or not it is built into a camera and for the purpose of explaining the invention it will now be described as embodied in a still camera of the folding type.

In the embodiment illustrated in the drawing, the camera has a body portion 10 with a bed 11 hinged thereto and adapted to unfold to a position determined by bed braces 12 as shown.

A lens board 13 containing a shutter and diaphragm assembly for its lens 14 is attached to the camera body 10 by a conventional spring-actuated linkage 15 and rendered light tight by a bellows 16. The camera is shown provided with a range finder 17 which is preferably coupled in any well-known manner (not shown) to the focusing movement of the lens 14. The setting, release and timing elements are assembled within a supplemental cover 18 hinged to the camera body 10 above the bellows 16 and movable to the position shown in Fig. 1 when the camera is opened, by reason of its sliding connection with the lens board 13.

The manner in which the camera folds and unfolds, the shutter and its control, and the adjustment of the diaphragm are fully described and illustrated in my copending applications Serial No. 106,552 filed October 20, 1936 and 108,396 filed October 30, 1936, which have matured respectively into Patents No. 2,124,886 of July 26, 1938 and No. 2,117,971 of May 17, 1938 and will be referred to herein only as much as is necessary for a complete understanding of the present invention.

Figure 2:
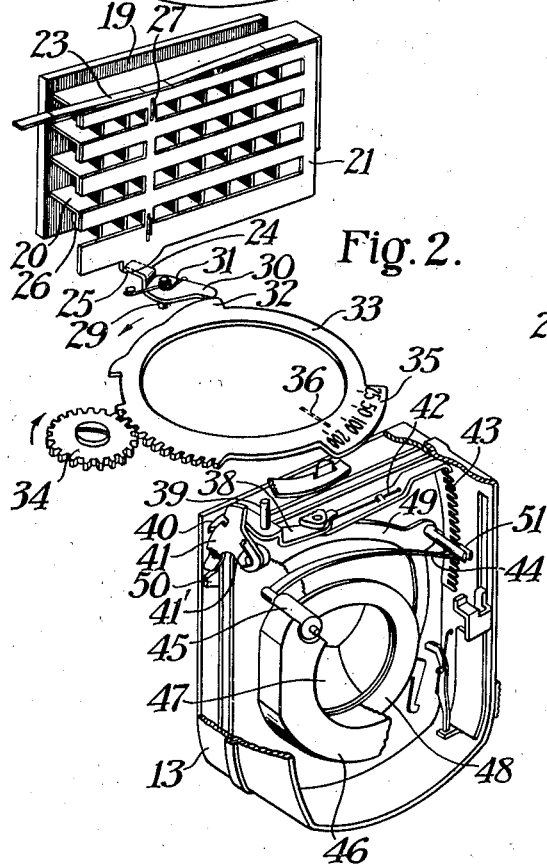
Fig. 2 is a fragmentary perspective view of the camera parts embodying the working elements of the invention.
Figure 4:
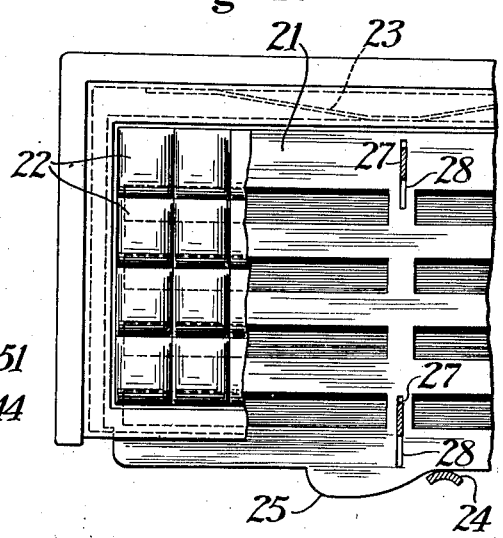

Fig. 2 shows the assembly of the mechanism claimed herein comprising a cell 19 which with its multiple chamber baffle 20 and movable grid 21 is positioned behind a plurality of lenses 22 carried in the front of the camera body 10 and above the supplemental cover 18. The grid 21 is biased in a downward direction by a suitable spring member 23 and is held against the bias of the spring 23 by an arm 24 which bears against a cam surface 25 provided on the lower edge of the grid 21.

The baffle members 26 have bent over end portions 26 which cover approximately one half of the front of the baffle chambers and cooperate with the movable grid 21 to exclude all light from the chambers when the grid 21 is in its extreme downward position as determined by supporting members 27 projecting through slots 28 provided in the grid 21.

Each of the lenses 22 is chosen having a focal length substantially equal to its distance from the cell 19 and is positioned immediately in front of the grid 21 so that the variable opening formed by the end portions 26 and the grid 21 is close enough to the diaphragm plane of a lens 22 to act as a diaphragming means.

The arm 24 which bears against the cam 25 is mounted for rotation on a pin 29 and has an extending lever 30 which by means of a spring 31 is resiliently held against a cam 32 carried by a ring 33 of the shutter speed setting mechanism. The ring 33 may be rotated by a gear 34 for adjusting the setting of the shutter, which setting is indicated by a scale 35 and an index 36 and may be rendered visible to the camera user by providing a transparent window 37 in the supplemental cover 18.

As is fully described in my above identified applications, adjustment of the ring 33 determines the exposure period of the shutter and a cell controlled meter determines the aperture of the lens during the exposure. This mechanism includes a lever 38 which is rotated about its pivot 39 upon operation of the camera release (not shown) thereby disengaging its end 40 from a latch member 41 and, through a spring 42, swings forward a comb member 43 to entrap a pointer 44 in the position determined by a meter coil 45 as energized by the cell 19.

The coil 45 has a magnet 46 which surrounds the optic axis of the lens 14 and is carried in the lens board 13 along with the diaphragm having leaves or vanes 47 and a ring 48 adjustable for altering its setting as is well known. For adjusting the ring 48, a V-shaped arm 49 is provided having one prong connected to the ring 48 and the prong pivoted (not shown) near its end 50. This diaphragm lever 49 is biased by means (not shown) tending to rotate it in a clockwise direction to reduce the aperture of the objective lens 14. The lever 49 is normally held in its extreme counterclockwise position by the end of latch 41 bearing against its end 50.

When the lever 38 is rotated to trap the pointer 44 and remove the end 40 of the lever 38 from engagement with the latch 41, a spring 41' rotates the latch 41 out of the path of the end 50 of the diaphragm lever 49 and the biasing means rotates the lever 49 in a clockwise direction until a bifurcated pin 51 carried by the lever 49 engages the entrapped pointer 44 after which the exposure is made at the aperture determined by the pointer 44 and for an interval determined by the shutter setting of the ring 33 all as described in my above identified applications.

Another important feature of the invention is incorporated in the arrangement of the cam arm 24 on the supplemental cover 18 in such manner that when the cover 18 is moved to camera closing position it rotates on a hinge 52 and moves the arm 24 away from the grid cam 25 thereby permitting the spring 23 to move the grid 21 to its extreme downward position, as determined by the supports 27 and slots 28, at which all light is excluded from the cell 19 and the effective aperture of the lenses 22 is zero.

While I have described the invention as applied to a specific camera structure it will be obvious to those skilled in the art that it is susceptible to many modifications and may be incorporated in cameras of various types without departing from the scope of the invention as defined in the appended claim.

What I claim as new and desire to secure by Letters Patent of the United States, is:

A folding camera including a casing, a lens board, a cover plate hinged to the casing and adapted to swing out over the lens board when the camera is open, an exposure control device carried by the lens board and having a part movable for adjusting its setting, a light sensitive cell mounted on the camera casing, means adjustable for varying the transmission of light to the cell, and means carried by said cover plate for simultaneously moving said adjusting part and adjusting said light transmitting means.

JOSEPH MIHALYI.